May 3, 1938.  E. E. LUNDBERG  2,116,313
VEHICLE BODY
Filed Nov. 16, 1935  2 Sheets-Sheet 1
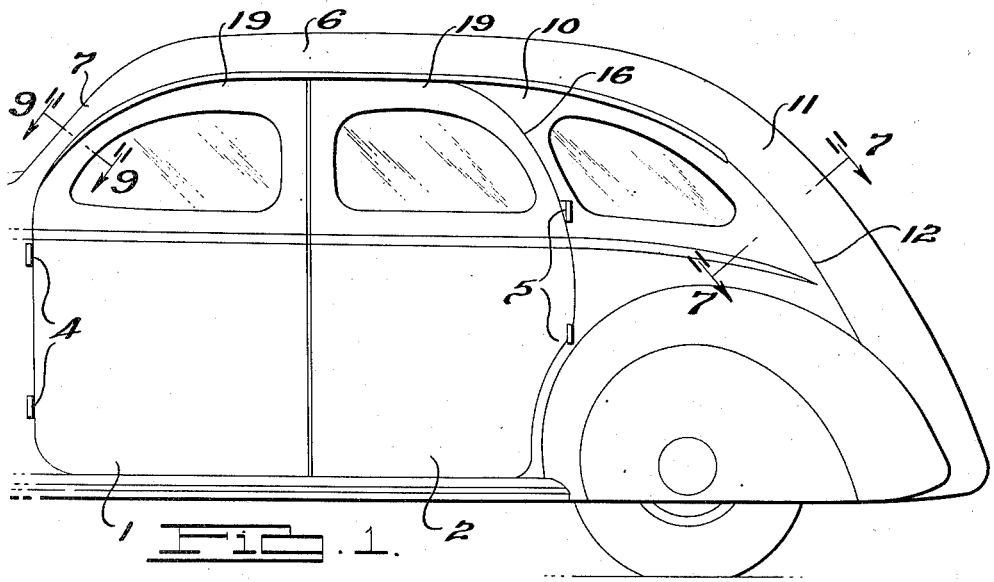
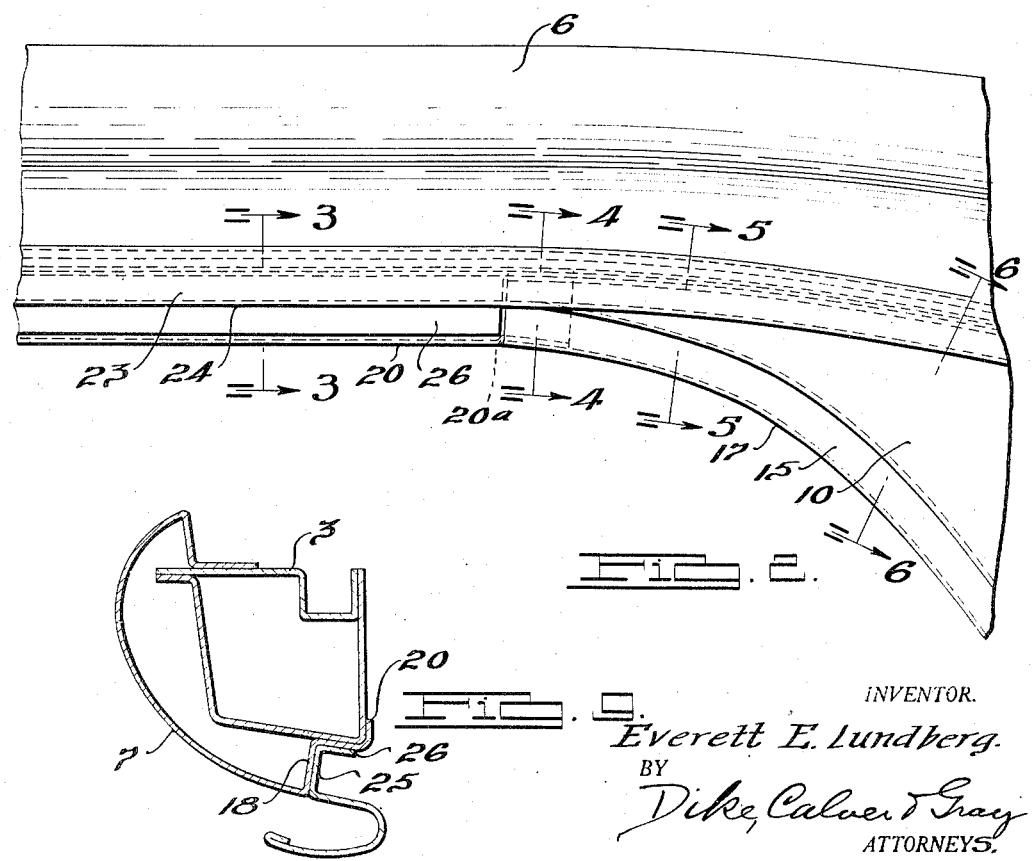
INVENTOR.
Everett E. Lundberg.
BY
Dike, Calvert & Gray
ATTORNEYS.

May 3, 1938.   E. E. LUNDBERG   2,116,313
VEHICLE BODY
Filed Nov. 16, 1935   2 Sheets-Sheet 2
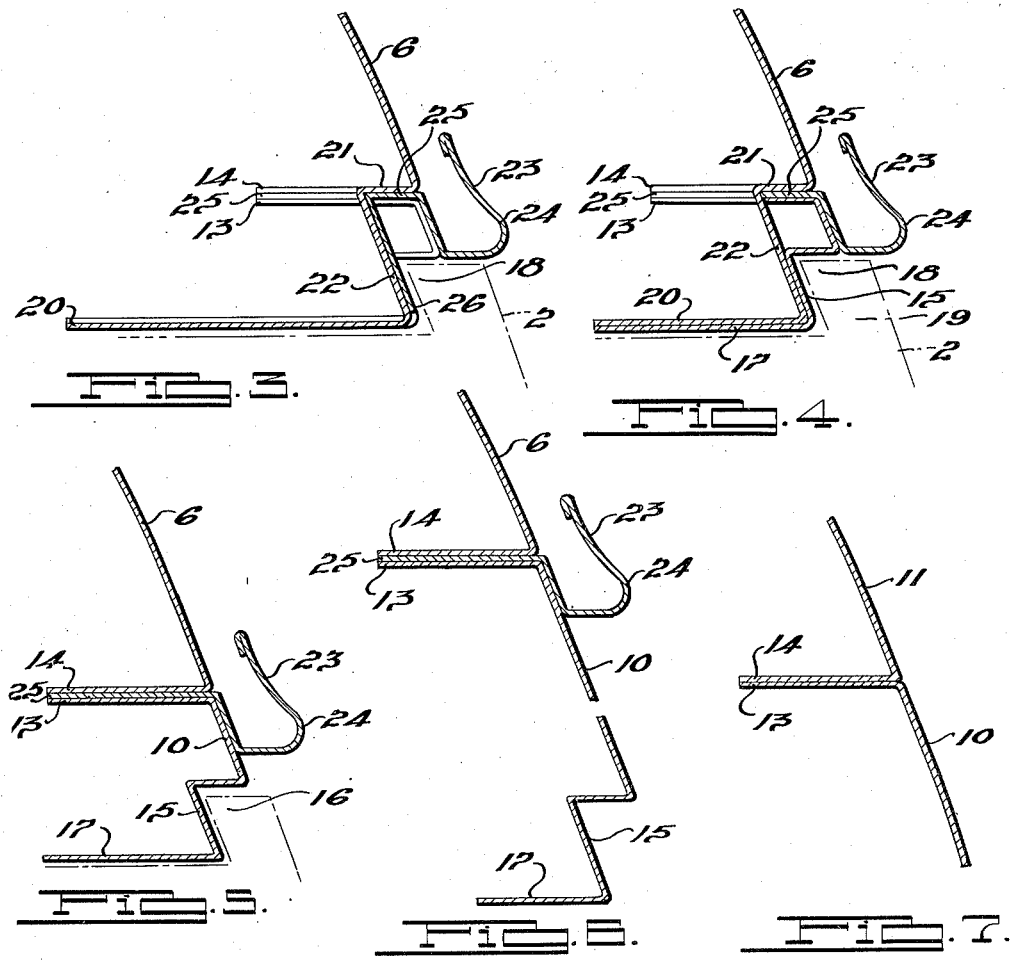
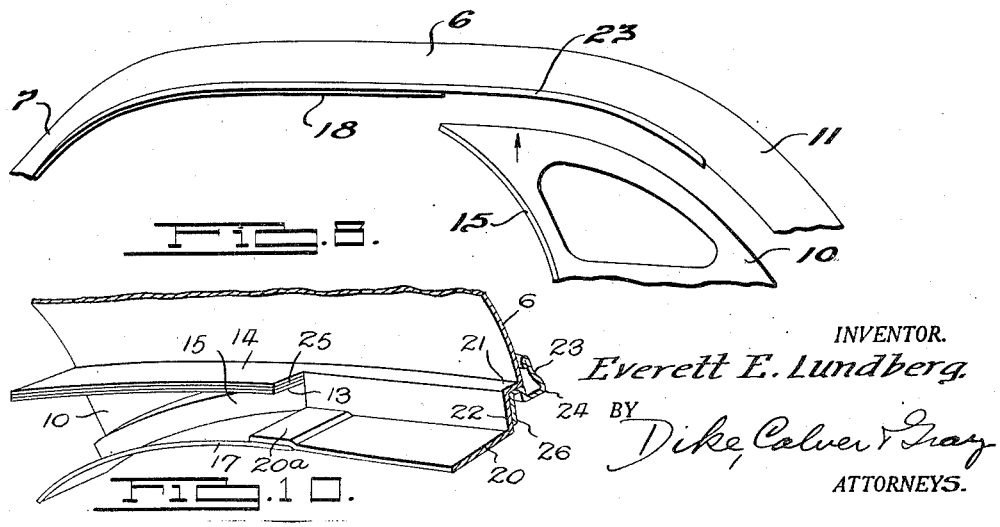
INVENTOR.
Everett E. Lundberg,
BY
Dike, Calvert & Gray
ATTORNEYS.

Patented May 3, 1938

2,116,313

UNITED STATES PATENT OFFICE 2,116,313

VEHICLE BODY

Everett E. Lundberg, Detroit, Mich., assignor to Briggs Manufacturing Company, Detroit, Mich., a corporation of Michigan Application November 16, 1935, Serial No. 50,217

9 Claims. (Cl. 296—28)

This invention relates to automobile bodies and particularly to enclosed bodies having a roof, or at least a side portion thereof, and the rear quarter panel formed of sheet metal, and in which the edges of these members are turned in towards the interior of the body and secured together to form structural members.

The principal object of this invention is to provide an improved gutter or drip molding on such a body, extending over the doors and windows of the body so that any rain which runs off the side of the roof will not run down on to the windows or on to passengers who may be entering or leaving the car.

Another object of this invention is to incorporate such a drip molding or gutter into the body so that it contributes materially to the strength and rigidity thereof.

Another object of this invention is to provide a gutter or drip molding on such a body shaped so that water in the gutter will not be held against the seam between the edge of the roof and the rear quarter panel, so that the seam can be spot welded and still not have water leak into it.

Other objects of this invention will appear in the following description and appended claims, reference being had to the accompanying drawings forming a part of this specification wherein like reference characters designate corresponding parts in the several views.

In the drawings:

Fig. 1 is a side elevation of an automobile body embodying the preferred form of my invention.

Fig. 2 is a fragmentary side elevation on an enlarged scale of the part of the body shown in Fig. 1 at the upper forward corner of the rear quarter panel.

Fig. 3 is a section on the line 3—3 of Fig. 2 taken in the direction of the arrows.

Fig. 4 is a section on the line 4—4 of Fig. 2 taken in the direction of the arrows.

Fig. 5 is a section on the line 5—5 of Fig. 2 taken in the direction of the arrows.

Fig. 6 is a section on the line 6—6 of Fig. 2 taken in the direction of the arrows.

Fig. 7 is a section on the line 7—7 of Fig. 1 taken in the direction of the arrows.

Fig. 8 is an elevation of the roof panel or roof side panel and the rear quarter panel shown in their relative positions as they are about to be assembled.

Fig. 9 is a section on the line 9—9 of Fig. 1 taken in the direction of the arrows; and Fig. 10 is a fragmentary perspective view, taken from the inside of Fig. 2 in the region located between the section lines 3—3 and 5—5 of Fig. 2.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is illustrated, by way of example, an automobile body embodying my invention. This body, shown as of the sedan type, has the usual doors, 1 and 2, in each side thereof. The front door 1 is mounted along its front edge on the front pillar 3 by means of hinges 4 and swings out and forward as it opens. The rear door 2 is carried at its rear edge by two hinges 5. A stamped metal roof side panel 6, which may be formed integrally as a part of a one piece pressed metal roof or as a member associated with a non-metallic roof, extends horizontally above the doors and its forward portion extends down in front of the front door and is formed into the upper part 7 of the windshield pillar which embraces and is secured to the front pillar 3. The lower part of the front windshield pillar is in the present instance formed integrally with the cowl and extends up and is welded to the upper part 7. The rear part of the panel 6 extends back over the rear quarter panel 10 and continues on to form or is welded to the rear panel 11. The rear quarter panel 10 is joined to the combined side roof panel 6 and rear panel 11 along a seam 12, by means of inwardly extending flanges 13 and 14 on the edges of the rear quarter panel 10 and combined side roof panel 6 and rear panel 11 respectively, the flanges being spot welded or otherwise secured together.

The front edge of the rear quarter panel 10 is offset inwardly to form a rabbet 15 to receive the flange 16 on the rear edge of the door and is bent inward in a flange 17 forming part of the door jamb. The lower edge of the side roof panel 6, in front of the rear quarter panel, is similarly offset and bent in to form a rabbet 18 to receive the flanges 19 on the tops of the doors and to form a part 20 of the roof side rail. The rabbet 15 and flange 17 on the front edge of the rear quarter panel extend up and curve forward to the upper front corner of the panel, the end of the rabbet 15 lying in and fitting against the face of the rabbet 18 on the side roof panel 6 and the flange 17 lying within and up against an offset portion 20a of the flange 20 forming the roof side rail (Figs. 2, 4 and 10). The rabbet 18 and the roof side rail portion 20 extend forward and down along the front pillar 3 forming part of the windshield pillar 7. At the forward end of the rear quarter panel the flange 14 is broken across or cut through most of its width, the unbroken part continuing on forward as the top flange 21 of the door rabbet and the rest being bent downward to form the face 22 of the door rabbet 18 and inward to form part of the side roof rail 20, as best seen in Figs. 3 and 10.

A gutter or so-called drip molding 23 extends from a point on the windshield pillar 7 back over the doors 1 and 2 and over the rear quarter panel 10 to a point near the rear of the car. This gutter consists of U-shaped portion 24, which lies upon the outside of the body and forms the water carrying portion of the gutter, and a flange 25 by means of which the gutter is secured to the body. Near the back of the body this flange 25 extends in more or less horizontally between the flanges 13 and 14 on the rear quarter panel and side roof panel 6 respectively, and the three flanges are spot welded or otherwise secured together. Forward of the rear quarter panel, along the top of the doors and down to the windshield pillar the flange 25 lies in the door rabbet, being spot welded at suitable intervals to the flange 21, and has its inner portion 26 bent down in uniform engagement with the face of the rabbet. The return bent flange 26 of the gutter or drip molding channel is spot welded at suitable intervals to the rabbet portion 22 of the side roof rail. The rear end of the inner portion 26 of the gutter flange 25 abuts against the front end of the face of the rabbet 15 on the rear quarter panel, lying flush with it so that the face of the door rabbet is smooth and level from the bottom of the rear quarter panel up and around and down along the windshield pillar.

Thus along the upper margin of the rear quarter panel 10 the welded joint between said panel and the roof panel is formed of three thicknesses of metal, thereby stiffening and strengthening the body along this joint. Moreover, in advance of the rear quarter panel the side roof rail, formed by rabbeting and inwardly flanging the lower portion of the pressed steel roof panel 6, is reenforced and stiffened by means of the flanging 25, 26 of gutter 23 which flanging being of structural or angle formation adds materially to the strength of the body.

The construction which I have described, provides a gutter along the side of the body which not only serves to divert water but also enters into and forms an integral part of the body structure, thus allowing the weight of the other parts to be reduced so that part of the expense of the gutter is saved through a reduction in the cost of the other parts of the body.

I claim:

1. In a vehicle body, a metal roof panel pressed to provide a door rabbet and jamb along the upper margin of a side wall opening, a side panel in rear of said opening, and a separate drip molding, said panels and drip molding having inwardly directed superimposed flanges of approximately a corresponding width forming three thicknesses of metal welded together, and said molding flange along the upper margin of said opening being cut and shaped to conform at least in part to said rabbet and welded thereto.

2. In a vehicle body, a metal roof panel pressed to provide a door rabbet and jamb along the upper margin of a side wall opening, a side panel in rear of said opening, and a separate drip molding, said panels and drip molding having inwardly directed superimposed flanges of approximately a corresponding width forming three thicknesses of metal welded together, and said molding flange along the upper margin of said opening being cut and shaped to conform at least in part to said rabbet and welded thereto, said drip molding being formed to provide an exterior gutter offset below the juncture of said flanges.

3. In a vehicle body, a metal roof panel terminating in a side roof rail along the upper margin of a door opening, a rear side panel, and a separate pressed metal drip molding, said panels having inwardly directed superimposed flanges and said molding having a flange interposed therebetween, the panel flanges being welded together through the medium of said molding flange, and said molding flange in advance of said side panel being extended along the face of the roof rail and welded thereto for reenforcing the same.

4. In a vehicle body, a pressed metal roof panel formed with an outer longitudinal rabbet above a side wall opening of the body, a rear quarter side panel, and a metal drip molding, said panels and molding having inwardly directed superimposed flanges providing three thicknesses of metal spot welded together, and said molding flange in advance of said side panel being cut and shaped to conform at least in part to said rabbet and welded thereto.

5. In a vehicle body, a pressed metal roof panel formed with an outer longitudinal rabbet above a side wall opening of the body, a rear quarter side panel, and a metal drip molding, said panels and molding having inwardly directed superimposed flanges providing three thicknesses of metal spot welded together, and said molding flange in advance of said side panel being cut and shaped to conform at least in part to said rabbet and welded thereto, said molding comprising an exterior gutter offset below the line of juncture of said flanges.

6. In an automobile body, a rear quarter panel, a roof panel having its lateral portion curved down to define the top of a door opening and to meet the rear quarter panel, the marginal portion of the roof panel being bent in along a smooth curve to form a flange which is part of the roof side rail above the rear quarter panel and to define the top of a door opening in front of the rear quarter panel, the flange above the door opening being cut transversely at the juncture of the rear quarter panel and door opening and offset downwards along a line parallel to the surface of the body to form a door rabbet, the offset portion forming another part of the roof side rail, and a drip molding extending along the smooth curve above the rear quarter panel and above the door opening and having a flange extending in under and in contact with the flange on the roof panel, said molding above said door opening having a flanged portion extending downwards flatwise against the face of the downward offset flange of the roof panel, the rear quarter panel having a flange along its upper edge extending in under and in contact with the first named flange on the drip molding, the flanges being welded together.

7. In an automobile body, a rear quarter panel, a roof panel having its lateral portion curved down to define the top of a door opening and to meet the rear quarter panel, the marginal portion of the roof panel being bent in along a smooth curve to form a flange which is part of the roof side rail above the rear quarter panel and which defines the top of a door opening in front of the rear quarter panel, the flange above the door opening being offset downwards along a line parallel to the surface of the body to form a door rabbet, the offset portion forming another part of the roof side rail, and a drip molding extending along the smooth curve above the rear quarter panel and above the door opening and having a flange extending in under and in contact with the flange on the roof panel, the portion of the flange above the door opening having its inner portion separated from the portion above the rear quarter panel by a cut and being bent down and fitted against the portion of the flange on the roof side panel forming the face of the door rabbet, the rear quarter panel having a flange along its upper edge extending in under and in contact with the flange on the drip molding, and the flanges being welded together.

8. In an automobile body, a rear quarter panel having its front edge offset inwards to form a door rabbet, a roof panel having its lateral portion curved down to define the top of a door opening and to meet the rear quarter panel, the marginal portion of the roof panel being bent in along a smooth curve to form a flange which is part of the roof side rail above the rear quarter panel and which defines the top of the door opening in front of the rear quarter panel, the flange above the door opening being offset downwards along a line parallel to the surface of the body to form a door rabbet, the offset portion forming another part of the roof side rail, the door rabbet on the front edge of the rear quarter panel terminating and fitting into the door rabbet on the marginal portion of the roof panel, and a drip molding extending along the smooth curve above the rear quarter panel and above the door opening and having a flange extending in under and in contact with the flange on the roof panel, the portion of the flange above the door opening having its inner portion separated from the portion above the rear quarter panel by a cut and being bent down and fitted against the portion of the flange on the roof side panel forming the face of the door rabbet, the rear end of the cut and bent down portion butting up against the front end of the face of the door rabbet on the front edge of the rear quarter panel to form a continuous smooth door rabbet face, the rear quarter panel having a flange along its upper edge extending in under and in contact with the flange on the drip molding, and the flanges being welded together.

9. In an automobile body, a rear quarter panel having its front edge offset inwards to form a door rabbet, a roof panel having its lateral portion curved down to define the top of a door opening and to meet the rear quarter panel, the marginal portion of the roof panel being bent in along a smooth curve to form a flange which is part of the roof side rail above the rear quarter panel and which defines the top of the door opening in front of the rear quarter panel, the flange above the door opening being offset downwards along a line parallel to the surface of the body to form a door rabbet the offset portion forming another part of the roof side rail, the door rabbet on the front edge of the rear quarter panel curving up and forward and terminating and fitting into the door rabbet on the marginal portion of the roof panel, the end of the door rabbet on the rear quarter panel being approximately tangent to the door rabbet on the roof panel, and a drip molding extending along the smooth curve above the rear quarter panel and above the door opening and having a flange extending in under and in contact with the flange on the roof panel, the portion of the flange above the door opening having its inner portion separated from the portion above the rear quarter panel by a cut and being bent down and fitted against the portion of the flange on the roof side panel forming the face of the door rabbet, the rear end of the cut and bent down portion butting up against the front end of the face of the door rabbet on the front edge of the rear quarter panel to form a continuous smooth door rabbet face, the rear quarter panel having a flange along its upper edge extending in under and in contact with the flange on the drip molding, and the flanges being welded together.

EVERETT E. LUNDBERG.